(12) United States Patent
Pelster et al.

(10) Patent No.: US 10,956,081 B2
(45) Date of Patent: Mar. 23, 2021

(54) METHOD, SYSTEM, AND APPARATUS FOR MULTI-TIERED PROGRESSIVE MEMORY PROGRAM OPERATION SUSPEND AND RESUME

(71) Applicant: INTEL CORPORATION, Santa Clara, CA (US)

(72) Inventors: David J. Pelster, Longmont, CO (US); David B. Carlton, Oakland, CA (US); Mark Anthony Golez, Folsom, CA (US); Xin Guo, San Jose, CA (US); Aliasgar S. Madraswala, Folsom, CA (US); Sagar S. Sidhpura, Folsom, CA (US); Sagar Upadhyay, Folsom, CA (US); Neelesh Vemula, Sunnyvale, CA (US); Yogesh B. Wakchaure, Folsom, CA (US); Ye Zhang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 104 days.

(21) Appl. No.: 16/388,761

(22) Filed: Apr. 18, 2019

(65) Prior Publication Data
US 2019/0243577 A1    Aug. 8, 2019

(51) Int. Cl.
    *G06F 3/06*    (2006.01)
(52) U.S. Cl.
    CPC .......... *G06F 3/0655* (2013.01); *G06F 3/0604* (2013.01); *G06F 3/0679* (2013.01)

(58) Field of Classification Search
    CPC .... G06F 3/0604; G06F 3/0655; G06F 3/0659; G06F 3/0679
    See application file for complete search history.

(56) References Cited

U.S. PATENT DOCUMENTS

| | | | | |
|---|---|---|---|---|
| 10,152,273 B2 * | 12/2018 | Micheloni | ............... | G06F 12/00 |
| 10,643,711 B1 * | 5/2020 | Yuan | ...................... | G11C 16/26 |
| 2019/0354498 A1 * | 11/2019 | Ebsen | .................... | G06F 9/4837 |

* cited by examiner

*Primary Examiner* — Aracelis Ruiz
(74) *Attorney, Agent, or Firm* — Konrad Raynes Davda & Victor LLP; Rabindranath Dutta

(57) ABSTRACT

A data structure is maintained for performing a program operation that is allowed to be suspended to perform reads in a NAND device, where the data structure indicates a plurality of tiers, where each tier of the plurality of tiers has a number of allowed suspends of the program operation while executing in the tier, and where a sum of the number of allowed suspends for all tiers of the plurality of tiers equals a maximum allowed number of suspends of the program operation. In response to performing a resume of the program operation, after performing a read following a suspend of the program operation, a determination is made of a tier of the plurality of tiers for the program operation and a subsequent suspend of the program operation is performed only after a measure of progress of the program operation has been exceeded in the determined tier.

20 Claims, 11 Drawing Sheets

Construct for Time based suspend-resume mechanism (suspend tier construct) — 500

| Suspend Tier | Suspends Issued Threshold for Tier | Time Allowed for Resume Progress |
|---|---|---|
| 1 | Tier 1 Suspend Count Threshold | Tier 1 Time |
| 2 | Tier 2 Suspend Count Threshold | Tier 2 Time |
| ... i ... | Tier i Suspend Count Threshold | Tier i Time |
| N | Tier N Suspend Count Threshold | Tier N Time |

Construct for Pulse based suspend-resume mechanism (suspend tier construct) — 700

| Suspend Tier | Suspends Issued Threshold for Tier | Pulses Required for Resume Progress |
|---|---|---|
| 1 | Tier 1 Suspend Count Threshold | Tier 1 Pulses |
| 2 | Tier 2 Suspend Count Threshold | Tier 2 Pulses |
| ... i ... | Tier i Suspend Count Threshold | Tier i Pulses |
| N | Tier N Suspend Count Threshold | Tier N Pulses |

METHOD, SYSTEM, AND APPARATUS FOR MULTI-TIERED PROGRESSIVE MEMORY PROGRAM OPERATION SUSPEND AND RESUME

BACKGROUND

A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and comprise a type of non-volatile storage technology. A requirement of SSDs may be to ensure that read and/or write commands are serviced in a reliable amount of time, and the performance of command latencies may be provided by a quality of service (QoS) metric. For example, a movie stored in a SSD in a laptop may have to be read and the QoS metric may be associated with the reading.

The quality of service of an SSD may be related to the predictability of low latency and consistency of high input/output operations per second (IOPS) while servicing read/write input/output (I/O) workloads. This means that the latency or the I/O command (i.e., read or write command) completion time needs to be within a specified range without having unexpected outliers. Throughput or I/O rate may also need to be tightly regulated without causing sudden drops in performance level.

BRIEF DESCRIPTION OF THE DRAWINGS

Referring now to the drawings in which like reference numbers represent corresponding parts throughout:

FIG. 5 illustrates a table that shows a time-based program operation suspend-resume mechanism, in accordance with certain embodiments;

FIG. 7 illustrates a table that shows a pulse based program operation suspend-resume mechanism, in accordance with certain embodiments;

DETAILED DESCRIPTION

Figure 1:
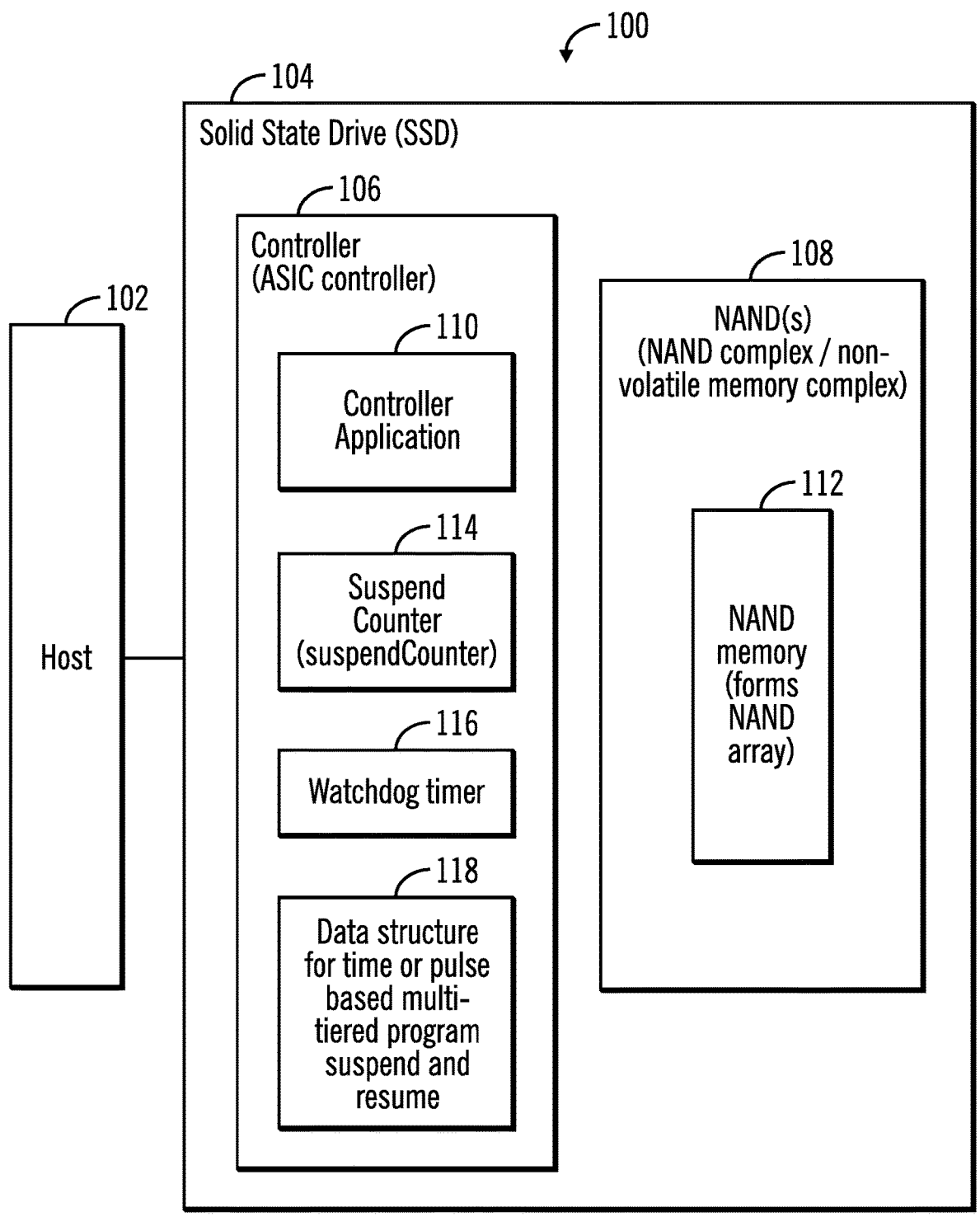
FIG. 1 illustrates a block diagram of a computing environment in which a host performs read and memory program operations on a SSD, in accordance with certain embodiments.

In the following description, reference is made to the accompanying drawings which form a part hereof and which illustrate several embodiments. It is understood that other embodiments may be utilized and structural and operational changes may be made.

Certain NAND media devices may allow either a single read or single program operation command (i.e., a write command) to access a NAND array at a time, where a NAND array may comprise an array of NAND strings, and where a NAND string may comprise a plurality of NAND cells. A program operation may be suspended to accommodate a waiting read operation, and then on completion of the read operation, the program operation may be resumed. This is referred to as a suspend-resume of the program operation. Program operation latencies may be an order of magnitude larger than read operation latencies, and to improve read operation latencies NAND SSDs leverage the program operation suspend-resume (PSR) capability of the NAND device to suspend (pause) an in-progress program operation to the NAND array and then allow one or more queued read operations to proceed and complete before resuming the suspended program operation. A program operation may be performed for programming (i.e., writing) to a NAND, such as a Multi-level cell (MLC) NAND. Program operations may also be performed for other types of NAND [Quad Level Cell (QLC), Single Level Cell (SLC), three-dimensional) and other types of non-volatile memory. It should be noted that a program operation on a NAND performs a write operations on the NAND.

A "first problem" for the above approach is that the number of allowed program operation suspends per program operation (i.e., the number of times a single program command may be suspended) may be limited by the NAND media policy (e.g. QLC NAND policies or three-dimensional NAND policies). For example, certain three-dimensional NAND devices have a NAND media policy that limits the number of allowed suspends per program operation. Once the number of allowed program operation suspends are exhausted the program operation may no longer be suspended and the program operation must complete before any new commands are accepted by the NAND device. Thus, all read operations (i.e., read commands) that continue to queue behind this program operation wait for the program operation to complete.

A "second problem" for the above approach is that after being resumed when there are still available suspends that are possible, a program operation is allowed to be re-suspended on-demand without guaranteeing any progress on the program operation.

Thus, if the NAND exhibits very long program operation latencies relative to read operation latencies, and given an on-demand program operation suspend policy that issues a program operation suspend after a new read operation is queued and qualified for dispatch to the target NAND device, and the PSR method does not guaranteed any progress of any portions of the resumed program operation ("second problem"), then the NAND SSD is exposed to scenarios where the maximum allowed suspends may be exhausted ("first problem") while a significant portion of the program operation is yet to be completed.

Certain embodiments provide mechanisms for a time or pulse based multi-tiered suspend-resume mechanisms to address the problems outlined above and improve the operations of a non-volatile memory device, such as a SSD with NAND memory.

FIG. 1 illustrates a block diagram of a computing environment 100 in which a host 102 sends a request command to a SSD 104, and a SSD controller 106 in the SSD 102 performs read and program operations on the memory [e.g., magnetoresistive random access memory (MRAM), dynamic random access memory (DRAM), NAND, OPTANE* (OPTANE is a trademark of Intel Corporation] of the SSD 106 in accordance with certain embodiments. The SSD 104 may be comprised of a controller 106 and a NAND complex 108, where in certain embodiments the NAND complex 108 may be a Triple Level Cell (TLC) NAND or any other type of NAND [e.g., Single Level Cell (SLC), Multi Level Cell (MLC), Quad Level Cell (QLC), etc.] or any other type of non-volatile memory complex. In other embodiments the SSD 104 may be comprised of a controller 106 that controls certain other types of non-volatile memory, such as NOR memory or some other suitable non-volatile memory. Non-volatile memory is a storage medium that does not require power to maintain the state of data stored by the medium. Nonlimiting examples of non-volatile memory may include any or a combination of: solid state memory [such as planar or three Dimensional (3D) NAND flash memory or NOR flash memory], 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In certain embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In certain embodiments, the SSD 104 may be capable of storing several terabytes of data or more, and the NAND complex 108 may be comprised of a plurality of NAND memory 112 (e.g. NAND devices with NAND memory) that may form a NAND array. The NAND program operations may be used for many of the types of memory described above.

In certain embodiments, the host 102 may be comprised of any suitable computational device, such as a personal computer, a mainframe, a telephony device, a smart phone, a storage controller, a blade computer, a processor with memory, etc. In certain embodiments, the host 102 may communicate with the SSD 104 over a bus (such as a Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc.

In certain embodiments, a software application in the host 102 sends read and/or write commands (i.e., I/O command) to the SSD 104 via an interface [e.g., a storage controller interface, such as, Serial Attached Small Computer System Interface (SAS), Serial AT Attachment (SATA), Peripheral Component Interconnect Express (PCIe), Non-Volatile Memory Express (NVMe), etc.] that couples the host 102 to the SSD 104. Certain embodiments relate to the execution of the read and/or write operations (i.e., commands) in the SSD 104 after the SSD 104 receives read and/or write commands from the host 102 over the interface. In certain embodiments, a controller application 110 (implemented in firmware, software, hardware or any combination thereof) that executes in the controller 106 of the SSD 104 receives the read and/or write commands from the host 102, and then the controller application 110 executes the read and/or write operations with respect to the NAND complex 108 by converting the read and/or write commands received from the host 102 into memory operations. A read is performed via a read operation from the NAND complex 108, whereas a write is performed via a program operation on the NAND complex 108. The controller 106 and the controller application 110 may be implemented in Application Specific Integrated Circuit (ASIC) and/or firmware, software, or any combination thereof.

In certain embodiments, a suspend counter 114 maintained in the controller 106 (or alternatively in the NAND complex 108) allows the tracking of the amount of used suspends towards the total allowed per program operation per NAND device. It should be noted that additional data structures besides the suspend counter 114 may be maintained in the controller 106 or the NAND complex, and all management of the suspend-resume process may be handled in the controller 106 or internally in the NAND complex 108. In certain embodiments, the additional data structures may include a watchdog timer 116 with a timer (or pulse value) that is maintained in the controller 106 (or alternatively in the NAND complex 108), and unless the watchdog timer (or pulse value) expires for a tier of performing of a program operation, the program operation is not suspended in the tier. In certain embodiments, the controller 106 also maintains one or more data structures 118 for time or pulse based multi-tiered program operation suspend and resume mechanisms.

Therefore, FIG. 1 illustrates certain embodiments in which a controller application 110 services I/O commands received from the host 102 to read and program (via read operations and program operations) the NAND memory 112 of the NAND complex 108, while trying to optimize the quality of service for completing the read and program operations in the SSD 104.

Figure 2:
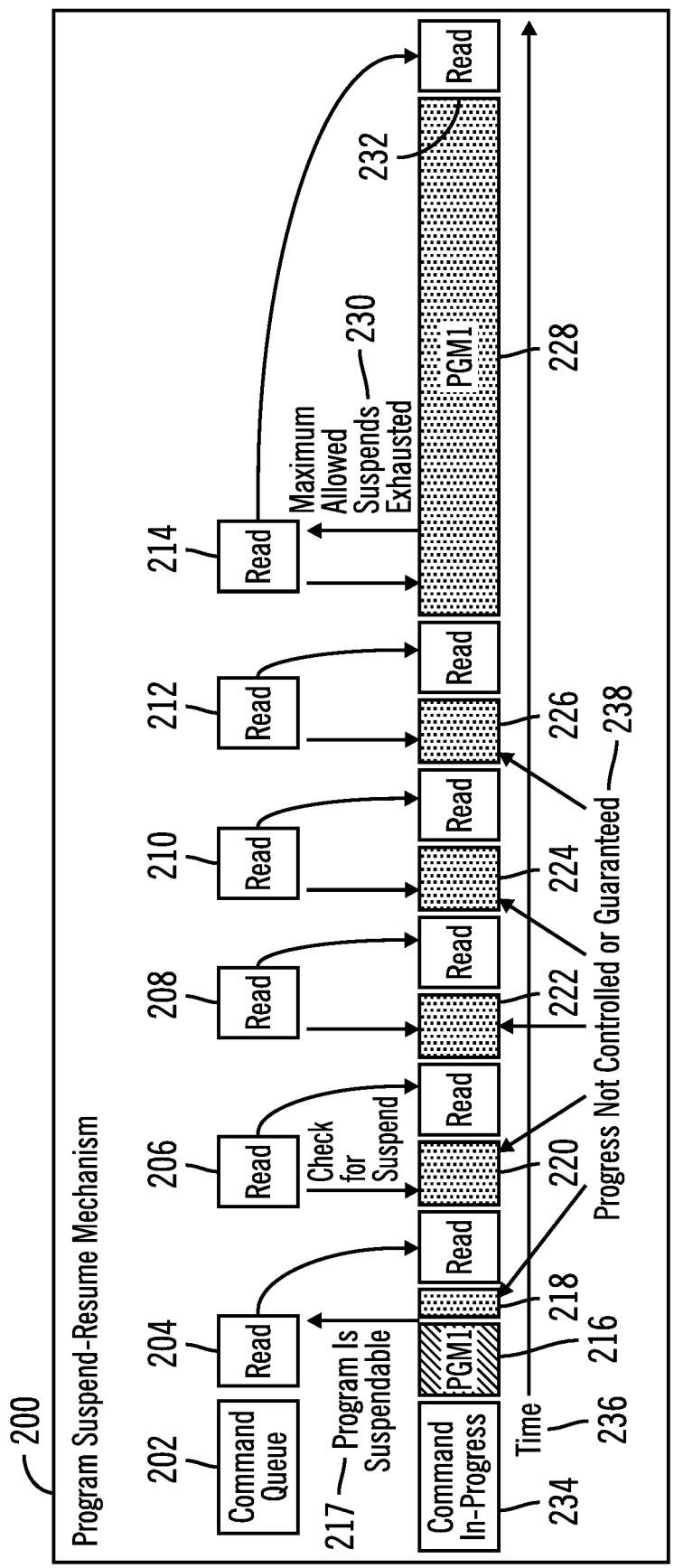
FIG. 2 illustrates a block diagram that shows a program operation suspend-resume mechanism, in accordance with certain embodiments.

FIG. 2 illustrates a block diagram 200 that depicts a suspend resume mechanism with 1 program operation (PGM1) and 6 read operations, where the read operations (shown in white boxes) in the command queue 202 are denoted via reference numerals 204, 206, 208, 210, 212, 214. In this example, the number of maximum allowed suspends is 5. The hatched box 216 denotes the initial suspendability (shown via reference numeral 217 indicating that program operation is suspendable) of the program operation, while lightly shaded boxes 218, 220, 222, 224, 226, 228 denote that the program operation is in-progress on a NAND device. The reads queue over time while the program operation is resumed. After 5 suspend-resumes, the program operation has exhausted its allowed suspend count, (reference numeral 230) and the last read 214 waits for the full program operation to complete (shown via reference numeral 232), as shown in the command in-progress 234 section of the block diagram 200 that shows the passage of time 236.

In certain embodiments, for example, PGM1 is a quad-level cell (QLC) program operation that has latency of 10 milliseconds, and each new read command arrives every 100 microseconds but only after each read completion. The average read latency may be around 80 microseconds and average suspend latency may be around 200 microseconds. In the embodiments shown in FIG. 2 resumes are not guaranteed any progress (as shown via reference numeral 238), and if other overheads are ignored then the last read command 214 experiences a read latency of round 9,880 microseconds, whereas the first 5 read commands 204, 206, 208, 210, 212 experience a latency of around 280 microseconds. The latency of a read refers to the time taken to complete execution of a read operation. This very large latency for the last read command 214 may result in an unacceptable QoS for reads.

Figure 3:
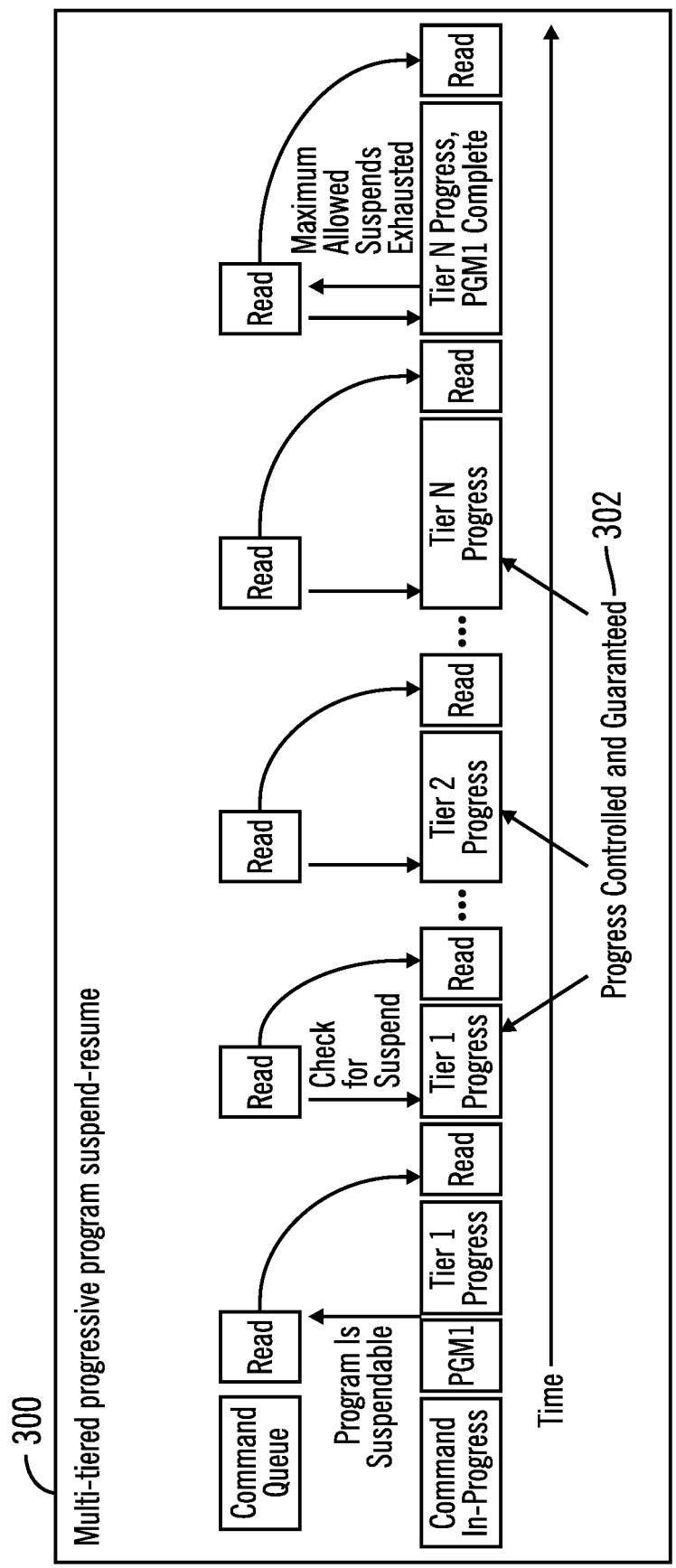
FIG. 3 illustrates a block diagram that shows a multi-tiered progressive suspend-resume mechanism, in accordance with certain embodiments.

FIG. 3 illustrates a block diagram 300 that depicts a Multi-tiered Progressive program operation suspend-resume mechanism that introduces in an SSD the capability to perform program operation suspend-resume by configuring N tiers of guaranteed program operation resume progress for each program operation resume command, based on the number of suspends that have so far been issued to a program operation command (N is a natural number greater than 1). The amount of guaranteed program operation resume progress may be configured to increase from tier to tier as suspend count increases, and also to overlap and hide the suspend latency (as shown via reference numeral 302). The SSD may then be optimally configured for read QoS while at the same time preventing program command starvation.

Figure 4:
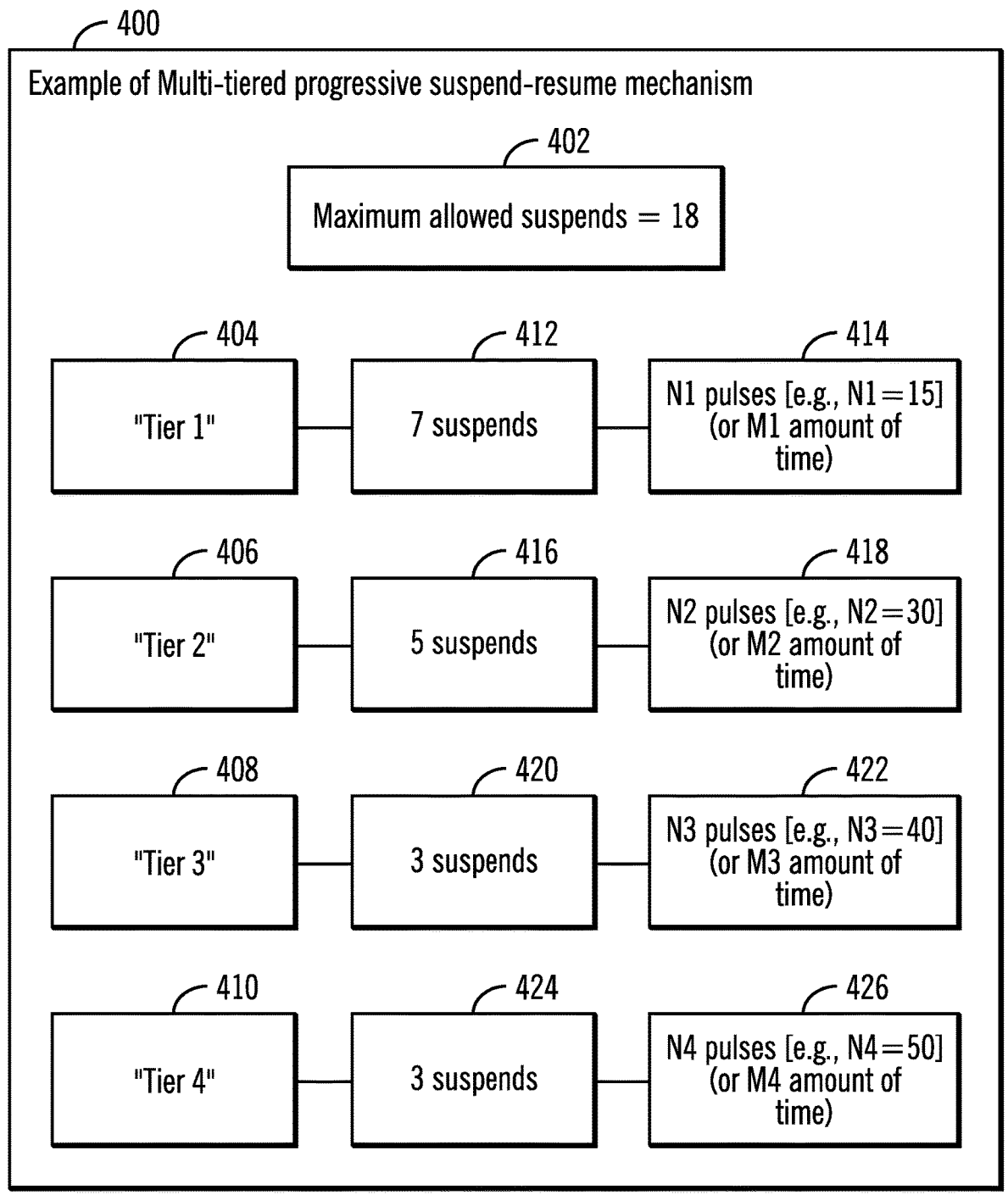
FIG. 4 illustrates a block diagram that shows an example of multi-tiered progressive program operation suspend-resume mechanism, in accordance with certain embodiments.

FIG. 4 illustrates a block diagram 400 that shows an example of multi-tiered progressive program operation suspend-resume mechanism, in accordance with certain embodiments.

The maximum allowed suspends of the program operation is shown to be 18 (reference numeral 402) and 4 tiers of execution of program operation are maintained (indicated as "Tier 1" 404, "Tier 2" 406, "Tier 3" 408, "Tier 4" 410).

In certain embodiments no more than 7 suspends of the program operation are allowed in "Tier 1" 404 (as shown via reference numeral 412) and a progress of N1 pulses (e.g., N1=15) is guaranteed for the program operation in "Tier 1" 404 before a program operation suspend is allowed (as shown via reference numeral 414). In embodiments that use an amount of time instead of the number of pulses, a progress of M1 amount of time (e.g., M1=7 milliseconds) is guaranteed for the program operation in "Tier 1" 404 (as shown via reference numeral 414).

In certain embodiments no more than 5 suspends of the program operation are allowed in "Tier 2" 406 (as shown via reference numeral 416) and a progress of N2 pulses (e.g., N2=30) is guaranteed for the program operation in "Tier 2" 406 before a program operation suspend is allowed (as shown via reference numeral 418). In embodiments that use an amount of time instead of the number of pulses, a progress of M2 amount of time (e.g., M2=15 milliseconds) is guaranteed for the program operation in "Tier 2" 406 (as shown via reference numeral 418).

In certain embodiments no more than 3 suspends of the program operation are allowed in "Tier 3" 408 (as shown via reference numeral 420) and a progress of N3 pulses (e.g., N3=40) is guaranteed for the program operation in "Tier 3" 408 before a program operation suspend is allowed (as shown via reference numeral 422). In embodiments that use an amount of time instead of the number of pulses, a progress of M3 amount of time (e.g., M3=20 milliseconds) is guaranteed for the program operation in "Tier 3" 408 (as shown via reference numeral 422).

In certain embodiments no more than 3 suspends of the program operation are allowed in "Tier 4" 410 (as shown via reference numeral 424) and a progress of N4 pulses (e.g., N4=50) is guaranteed for the program operation in "Tier 4" 410 before a program operation suspend is allowed (as shown via reference numeral 426). In embodiments that use an amount of time instead of the number of pulses, a progress of M4 amount of time (e.g., M4=25 milliseconds) is guaranteed for the program operation in "Tier 4" 410 (as shown via reference numeral 426).

In certain embodiments, the number of allowed suspends remains the same or decreases as the tier number becomes greater. However, the sum of the number of allowed suspends of all four tiers 404, 406, 408, 410 does not exceed 18 which is the maximum allowed number of suspends for an exemplary NAND memory as shown via reference numeral 402. In alternative embodiments, the number of allowed suspends need not remain the same or decrease as the tier number becomes greater. For example, in an alternative embodiment, the number of allowed suspends in "Tier 1" 404, "Tier 2" 406 "Tier 3" 408, and "Tier 4" 410 may be 2, 8, 4, and 4 respectively.

In certain embodiments the number of pulses remains the same or increases as the tier number becomes greater. In alternative embodiments, the number of pulses need not remain the same or increase as the tier number becomes greater. The number of pulses in the first tier may configured to a value of 0 for no progress and on-demand suspension. However the number of pulses in all the higher tiers is at least 1 in order to guarantee some progress of the program operation in the tier. If the progress of the program operation is measured in time units instead of pulses, similar considerations apply.

Therefore, as shown in FIG. 4, first a program operation is performed is "Tier 1" 404 where 7 suspends are allowed, but the program operation is not suspended unless N1 pulses have elapsed. As a result, progress is guaranteed for the program operation for at least N1 pulses in Tier 1, while at the same time limiting the number of suspends to 7. After the program operation is performed in Tier 1, then the program operation is performed in Tier 2, and then in Tier 3, and lastly in Tier 4. In certain embodiments, in each tier the number of allowed suspends for the tier is performed, unless the program operation is completed prior to the number of allowed suspends indicated for the tier being performed.

It may be observed that in each tier a guaranteed amount of progress is made in the program operation, while at the same time the total number of suspends are maintained within a predetermined limit ("Maximum allowed suspends") allowed by a NAND memory.

FIG. 5 shows a block diagram 500 of a construct (i.e., a data structure such as data structure 118) for a time based suspend-resume mechanism, in which N different tiers are configurable to allow time based progress of a resumed command.

Certain embodiments introduce a configurable construct to program N tiers 502 of progress times 504 for allowing time based control of the progress of a resume command, either globally for all NAND devices or per NAND device.

In certain embodiments, the threshold for each tier relative to total suspends issued in the in-progress program operation have a relationship that is shown below:
Tier 1 Suspend Count Threshold<=Tier 2 Suspend Count Threshold<= . . . <=Tier N Suspend Count Threshold. This is shown to be satisfied in the embodiment in FIG. 4, where the suspend count threshold for "Tier 1" is 7, for "Tier 2" is 7+5=12, for "Tier 3" is 7+5+3=15, and for "Tier 4" is 7+5+3+3=18.

The embodiments may be implemented in SSD controller 106 that manages multiple NAND devices, or completely contained and integrated in a NAND device so that the SSD controller 106 does not implement the embodiments, but the NAND device independently implement the embodiments in the NAND complex 108.

The embodiments also include a watchdog timer 116 per NAND device. When a program operation is resumed the solution determines how much time must transpire before a subsequent suspend may be issued to the NAND device. It does this by using the number of suspends issued in the in-progress program operation command to determine the suspend tier. Once the suspend tier is determined, the timer value assigned to that tier is used to program the watchdog timer for this NAND device. The NAND device is not allowed to accept any more suspend commands until the watchdog timer expires.

Figure 6:
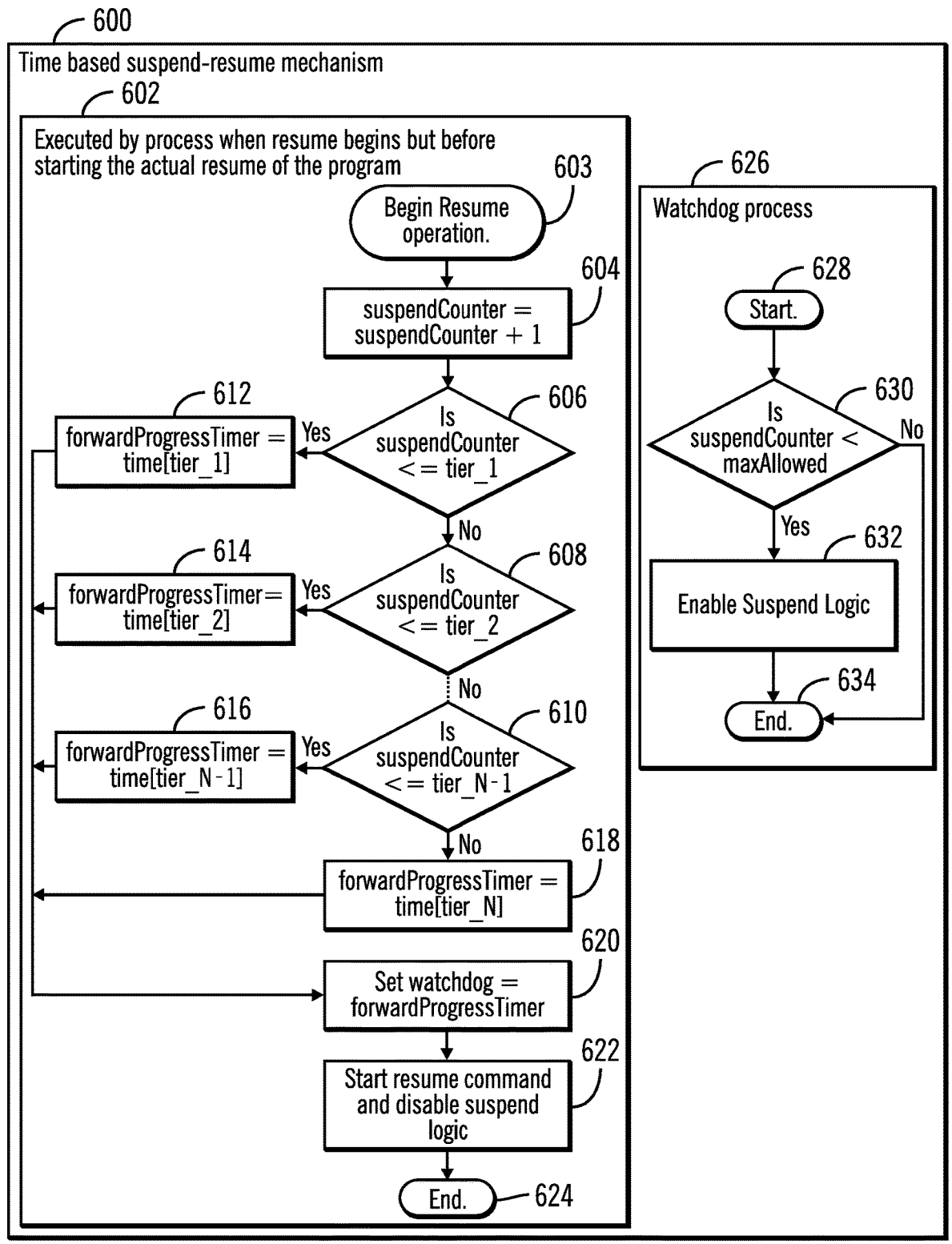
FIG. 6 illustrates flowcharts for a time based program operation suspend-resume mechanism, in accordance with certain embodiments.

FIG. 6 illustrates two flowcharts for a time based program operation suspend-resume mechanism 600, in accordance with certain embodiments.

The first flowchart 602 on the left is executed by a process when the resume begins but before starting the actual resume of the program operation. The process starts (at block 604 and then increments the suspend counter (at block 604 where the suspend counter is denoted by variable suspendCounter). Then the process determines the suspend tier using the suspend tier construct 500 (at block 606, 608, 610). The result of identifying the tier determines the amount of time that must transpire before a resume command may be re-suspended (at block 612, 614, 616, 618). The process sets that time to arm the watchdog timer (at block 620), and then disables suspend logic, and then starts the actual resume of the program operation (at block 622). The process then ends (at block 624).

The second flowchart 626 on the right is executed by a process referred to as a watchdog process. The watchdog process starts (at block 628) when the watchdog timer armed from the process 602 (at block 620) for the NAND device expires, and then determines if the suspend counter is less than the maximum allowed (at block 630; the maximum allowed being denoted by variable maxAllowed). If so, then the suspend logic is enabled (at block 632) and then the watchdog process ends (at block 634). If at block 630, the suspend counter is not less than the maximum allowed then the process ends (at block 634).

As an example, assume a NAND device has a worst case program operation latency of 10 milliseconds, a worst case suspend latency of 50 microseconds, a known minimum progress time of 250 microseconds, and total allowed suspends per program operation of 40, then a single tier nay be configured as 250 microseconds. Assume also that a single read command arrives during the guaranteed progress time. Then each read command may suspend the program operation and may see an overhead of roughly 250 microseconds of suspend latency (10 milliseconds/40 total suspends=250 microseconds per suspend).

Or, as another example, assume a NAND device has a worst case program operation latency of 10 milliseconds, a worst case suspend latency of 50 microseconds, a known minimum progress time of 250 microseconds, and total allowed suspends per program operation of 40. Two tiers may be configured, where the first 20 suspends use a timer of 50 microseconds, and the last 20 suspends use a timer of 250 microseconds. Again, assume also that a single read command arrives during the guaranteed progress time. In this example, since the minimum progress time is 250 microseconds, the first 20 suspends do not guarantee progress of the program operation, and the first 20 reads would see an overhead of 50 microseconds of suspend latency (simply the suspend latency), while the last 20 reads would see an overhead up to 50 microseconds [(10 milliseconds/20) tier2 suspends=500 microseconds per suspend].

FIG. 7 shows a block diagram 700 that describes a construct corresponding to a program pulse based mechanism, such that N different tiers are configurable to allow programming pulsing progress of a resumed program command. A program pulse is the incremental threshold voltage movement of a cell to its final target. Each pulse is therefore the minimum forward progress in a program operation.

Just like the time based embodiments shown in FIGS. 5 and 6, the embodiments shown in FIG. 7 may be implemented in the SSD controller 106 that manages multiple NAND devices, or completely contained and integrated in a NAND device so that the SSD controller 106 does not implement the embodiments, but the NAND device comprising a NAND memory implements the embodiments.

The embodiments shown in FIG. 7 introduce a configurable construct to program N tiers of progress pulses for specifying an exact minimum of program pulses that must be completed after the program operation is resumed before a subsequent suspend command can be allowed. This construct can exist either globally for all NAND devices if implemented at the SSD controller level, or per NAND device if the method is implemented completely encapsulated with the NAND device, where the threshold for each tier relative to total suspends issued in the in-progress program operation have a relationship that is shown below:
Tier 1 Suspend Count Threshold<=Tier 2 Suspend Count Threshold<= . . . <=Tier N Suspend Count Threshold.

Tier 1 may be configured to 0 pulses to enable a tier of no guaranteed forward progress. This may be desirable if the average pulse time is greater than the suspend latency of the NAND device. For any tier that is configured to be at least 1 pulse, the resumed program operation is only be allowed to be subsequently suspended at the end of the last pulse specified in the suspend tier construct.

Figure 8:
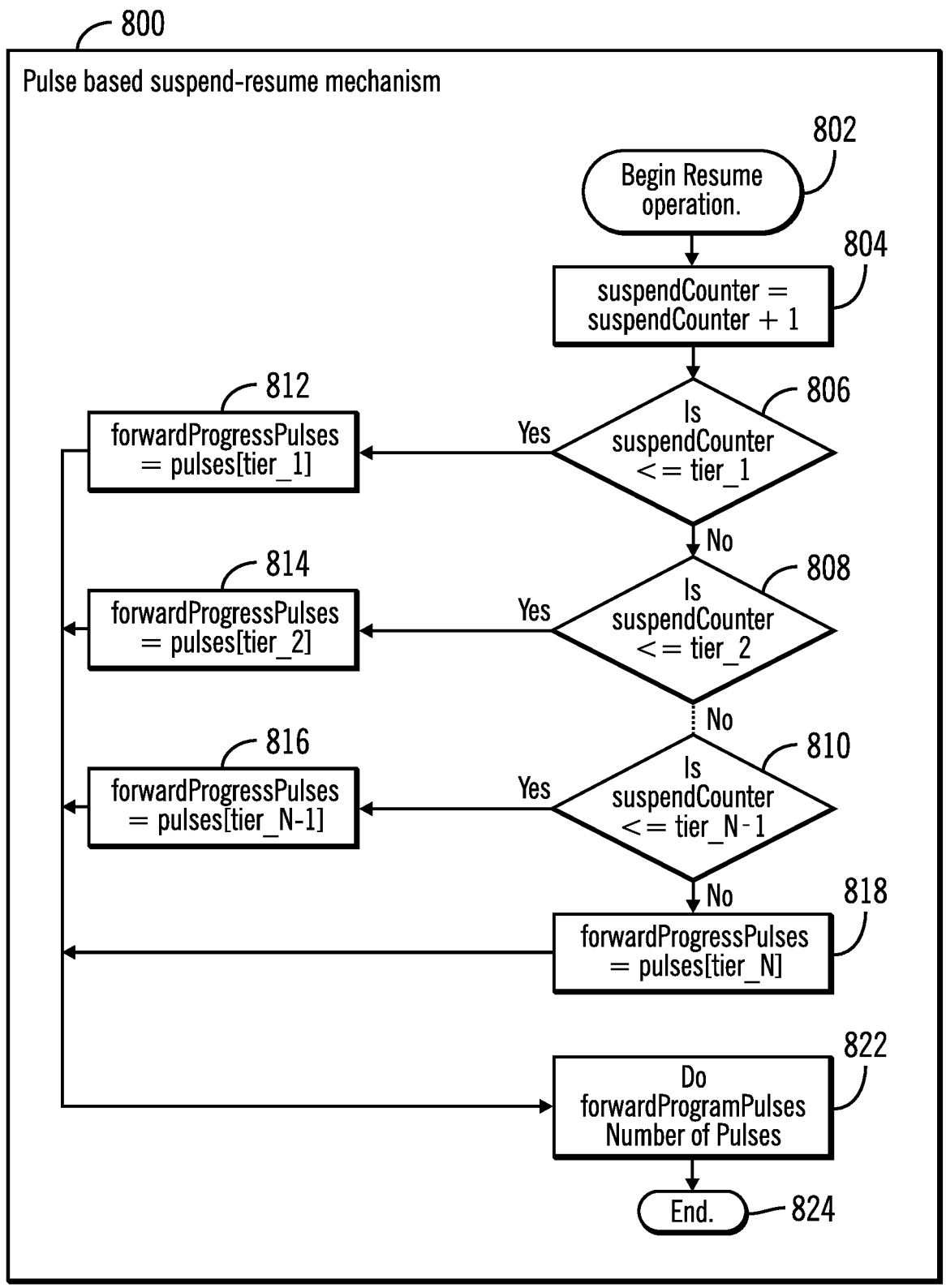
FIG. 8 illustrates a flowchart that shows a pulse based program operation suspend-resume mechanism, in accordance with certain embodiments.

FIG. 8 illustrates a flowchart 800 that shows a pulse based program operation suspend-resume mechanism, in accordance with certain embodiments, The flowchart operations for the resume process are executed by a process when the resume algorithm begins but before starting the actual resume of the program operation. The process starts at block 802 and increments the suspend counter (at block 804) and then determines the suspend tier using the suspend tier construct 700 (blocks 806, 808, 810). The result of identifying the tier determines the amount of pulses that must be completed before a resume command may be re-suspended (blocks 812, 814, 816, and 818). The process provides the tier's pulse count number to the program logic (controller application 110) and the program logic resumes by at least completing the pulses indicated in the pulse count number (at block 822) before allowing a suspend and then the process ends (at block 824).

If the solution is implemented on a NAND device, then the NAND device does not accept a new suspend until the number of pluses are complete. After those minimum number of pulses are complete then the programming continues. However, the NAND device would then allow program operation re-interruption on-demand by a new suspend command. If no suspend is issued, the program operation continues until it is finished.

If the solution is implemented in the SSD controller, then the NAND would complete the resume command after completing the minimum number of pulses and then remain suspended. Then the SSD controller, upon receiving the completion of the resume command may decide whether to issue another resume command, or any other command.

In certain embodiments, both time based and pulse based solutions may be extended to have a per program operation type suspend tier table, allowing the same control, but on a per program operation type granularity.

Figure 9:
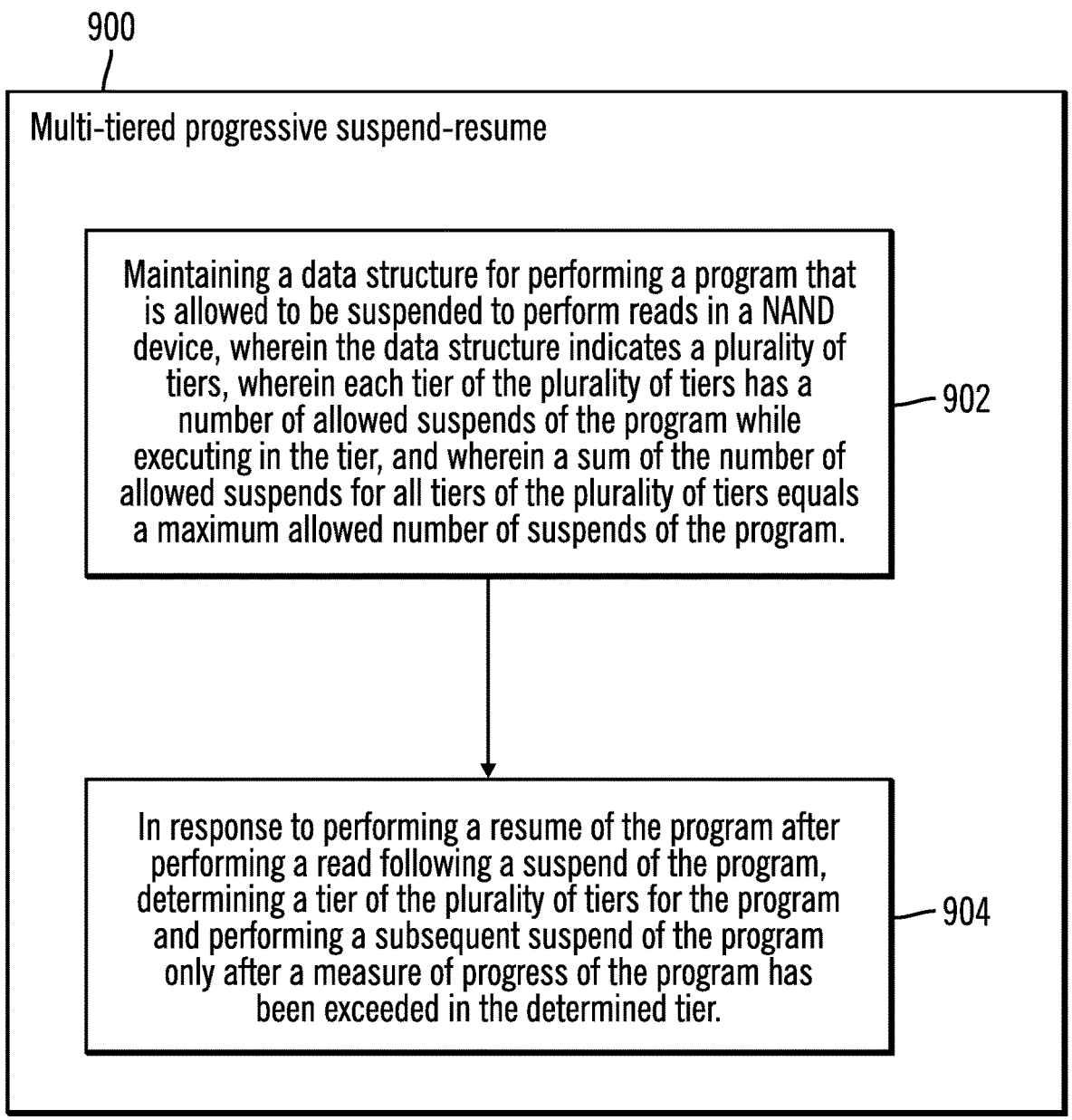
FIG. 9 illustrates a flowchart for multi-tiered progressive suspend-resume mechanism, in accordance with certain embodiments.

FIG. 9 illustrates a flowchart 900 of multi-tiered progressive program suspend-resume mechanism, in accordance with certain embodiments. The operations shown in FIG. 9 may be performed by the controller application 110 that executes in the controller 106.

Control starts at block 902 in which a data structure is maintained for performing a program operation in a NAND device, wherein the program operation is allowed to be suspended to perform reads in the NAND device, where the data structure indicates a plurality of tiers, where each tier of the plurality of tiers has a number of allowed suspends of the program operation while executing in the tier, and where a sum of the number of allowed suspends for all tiers of the plurality of tiers equals a maximum allowed number of suspends of the program operation.

From block 902 control proceeds to block 904 in which in response to performing a resume of the program operation, after performing a read following a suspend of the program operation, a determination is made of a tier of the plurality of tiers for the program operation and a subsequent suspend of the program operation is performed only after a measure of progress of the program operation has been exceeded in the determined tier.

In certain embodiments, in each tier of the plurality of tiers the number of allowed suspends indicated for the tier is performed, unless the program operation is completed prior to the number of allowed suspends indicated for the tier being performed. Furthermore, in each tier at least a predetermined amount of progress in an execution of the program operation is made.

Figure 10:
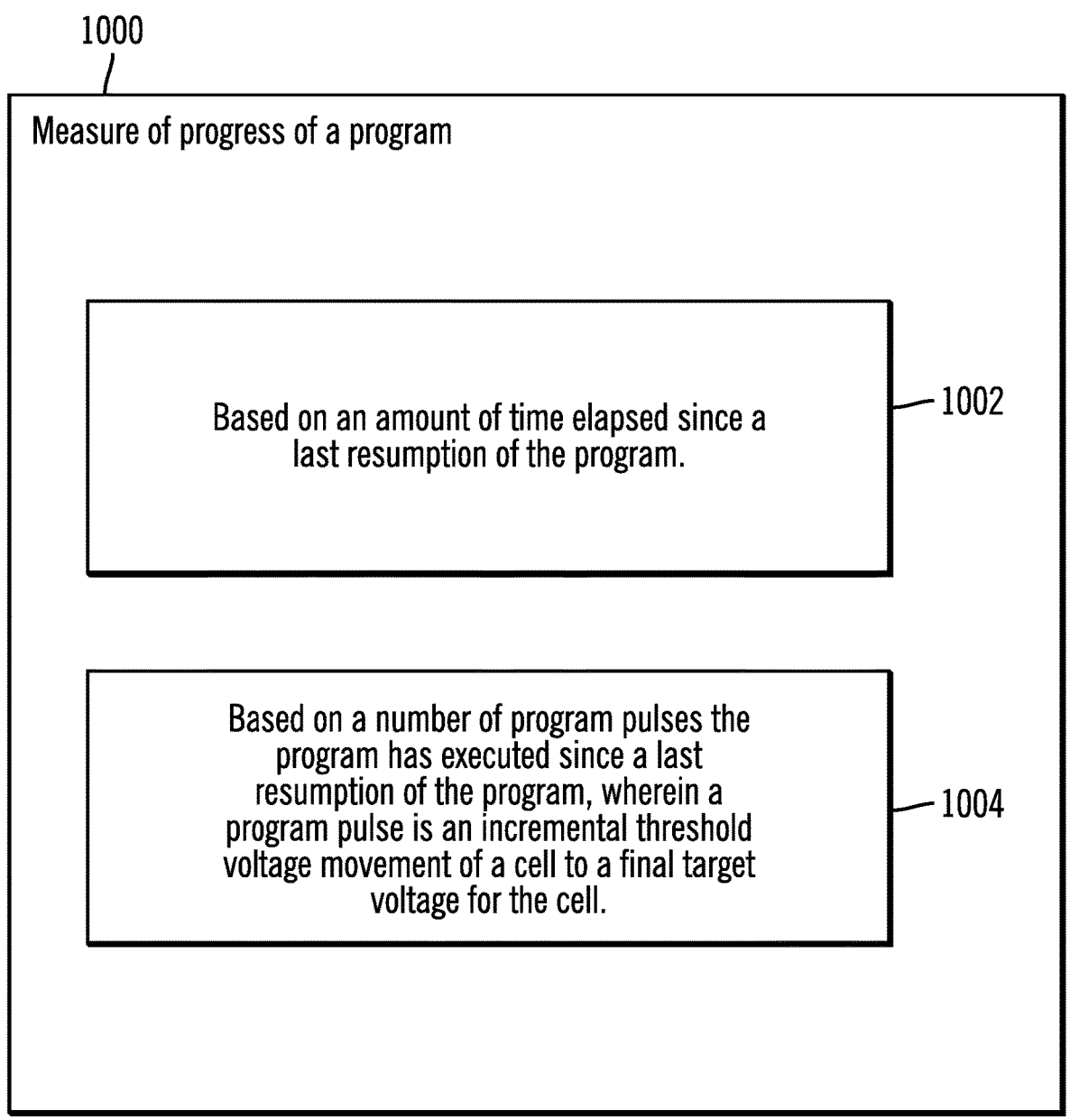
FIG. 10 illustrates a measure of progress of a program operation in a multi-tiered progressive suspend-resume mechanism, in accordance with certain embodiments.

FIG. 10 illustrates block diagram 1000 that shows a measure of progress of a program operation in a multi-tiered progressive suspend-resume mechanism, in accordance with certain embodiments. The operations shown in FIG. 10 may be performed by the controller application 110 that executes in the controller 106.

In certain embodiments, the measure of progress of a program operation is based on the amount of time elapsed since a last resumption of the program operation (block 1002). In other embodiments, the measure of progress of a program operation is based on a number of program pulses the program operation has executed since a last resumption of the program operation, wherein a program pulse is an incremental threshold voltage movement of a cell to a final target voltage for the cell.

Therefore, FIGS. 1-10 illustrate certain embodiments that make NAND SSD's QoS competitive by allowing configurations for uniform read QoS or for optimizing read QoS tradeoffs at different levels of read QoS percentiles for target workloads, and by allowing configurations for guaranteed resumed program operation progress at any tier that hides suspend latencies. When embodiments are implemented as an integrated NAND device solution, the embodiments eliminate firmware and SSD controller overheads and scales in systems with a very large number of NAND devices.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 11:
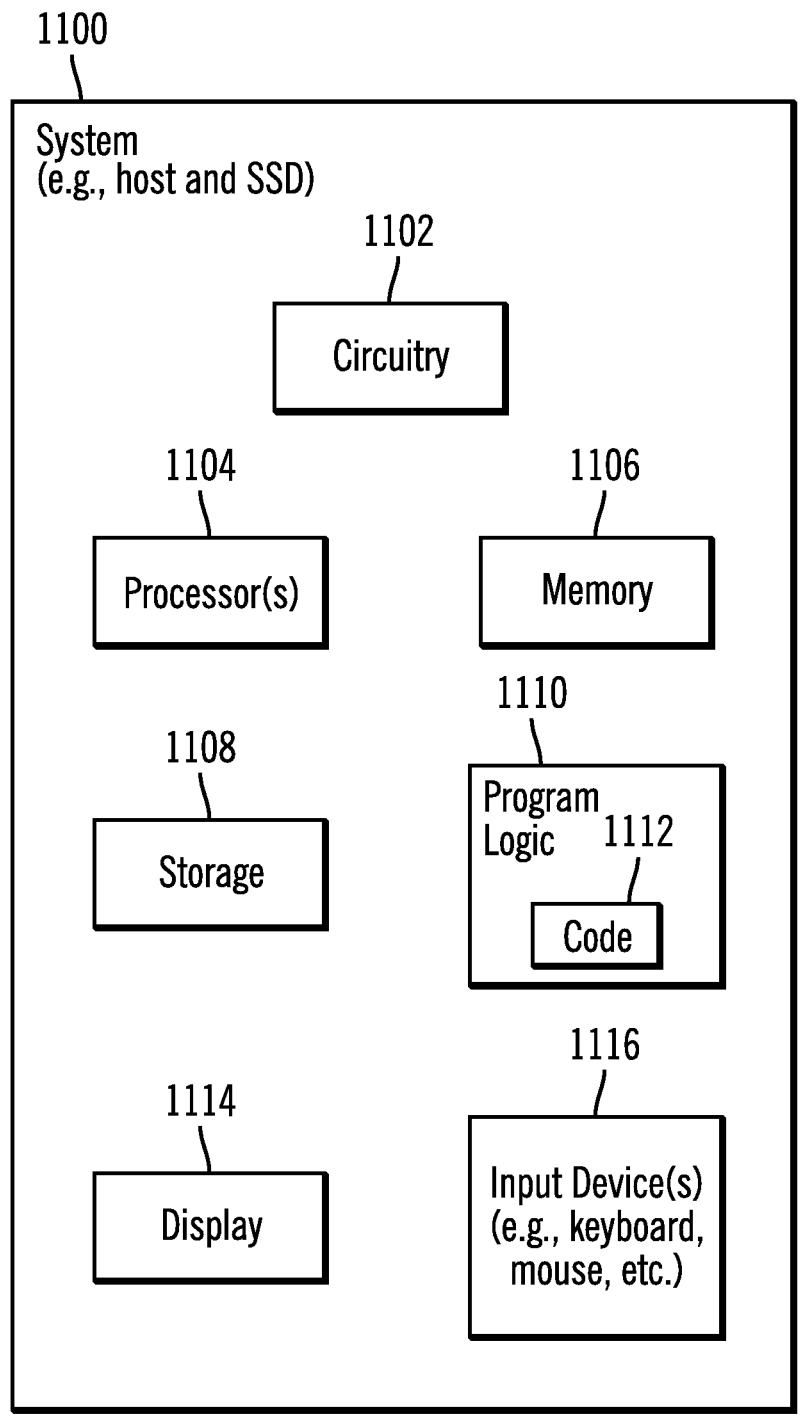
FIG. 11 illustrates a block diagram of a system, in accordance with certain embodiments.

FIG. 11 illustrates a block diagram of a system 1100 that includes both the host 102 (the host 102 comprises at least a processor) and the solid state drive 104, in accordance with certain embodiments. For example, in certain embodiments the system 1100 may be a computer (e.g., a laptop computer, a desktop computer, a tablet, a cell phone or any other suitable computational device) that has the host 102 and the solid state drive 104 both included in the system 1100. For example, in certain embodiments the system 1100 may be a laptop computer that includes the solid state drive 104. The system 1100 may include a circuitry 1102 that may in certain embodiments include at least a processor 1104. The system 1100 may also include a memory 1106 (e.g., a volatile memory device), and storage 1108. The storage 1108 may include the solid state drive 104 or other drives or devices including a non-volatile memory device (e.g., EEPROM, ROM, PROM, flash, firmware, programmable logic, etc.). The storage 1108 may also include a magnetic disk drive, an optical disk drive, a tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102. The system 1100 may also include a display 1114 (e.g., an liquid crystal display (LCD), a light emitting diode (LED) display, a cathode ray tube (CRT) display, a touchscreen display, or any other suitable display). The system 1100 may also include one or more input devices 1116, such as, a keyboard, a mouse, a joystick, a trackpad, or any other suitable input devices). Other components or devices beyond those shown in FIG. 11 may also be found in the system 1100.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method, the method comprising: maintaining a data structure for performing a program operation in a NAND device, wherein the program operation is allowed to be suspended to perform read operations in the NAND device, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and in response to performing a resume of the program operation, after performing a read following a suspend of the program operation, determining a tier of the plurality of tiers for the program operation and performing a subsequent suspend of the program operation only after a measure of progress of the program operation has been exceeded in the determined tier.

In example 2, the subject matter of example 1 may include that in each tier of the plurality of tiers at least a predetermined amount of progress in an execution of the program operation is made before a subsequent suspend is allowed.

In example 3, the subject matter of example 1 may include that in each tier of the plurality of tiers the number of allowed suspends indicated for the tier is performed, unless the program operation is completed prior to the number of allowed suspends indicated for the tier being performed.

In example 4, the subject matter of example 3 may include that the measure of progress of the program operation is based on an amount of time elapsed since a last resumption of the program operation.

In example 5, the subject matter of example 3 may include that the measure of progress of the program operation is based on a number of program pulses the program operation has executed since a last resumption of the program operation, wherein a program pulse is an incremental threshold voltage movement of a cell to a final target voltage for the cell.

Example 6 is an apparatus, the apparatus comprising: a non-volatile memory; and a controller, wherein the controller controls the non-volatile memory, and wherein the controller is operable to: maintain a data structure for performing a program operation in the non-volatile memory, wherein the program operation is allowed to be suspended to perform read operations in the non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

In example 7, the subject matter of example 6 may include that in each tier of the plurality of tiers at least a predetermined amount of progress in an execution of the program operation is made before a subsequent suspend is allowed.

In example 8, the subject matter of example 6 may include that in each tier of the plurality of tiers the number of allowed suspends indicated for the tier is performed, unless the program operation is completed prior to the number of allowed suspends indicated for the tier being performed.

In example 9, the subject matter of example 8 may include that the measure of progress of the program operation is based on an amount of time elapsed since a last resumption of the program operation.

In example 10, the subject matter of example 8 may include that the measure of progress of the program operation is based on a number of program pulses the program operation has executed since a last resumption of the program operation, wherein a program pulse is an incremental threshold voltage movement of a cell to a final target voltage for the cell.

Example 11 is a controller coupled to a non-volatile memory, wherein the controller is operable to: maintain a data structure for performing a program operation in the non-volatile memory, wherein the program operation is allowed to be suspended to perform read operations in the non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

In example 12, the subject matter of example 11 may include that in each tier of the plurality of tiers at least a predetermined amount of progress in an execution of the program operation is made before a subsequent suspend is allowed.

In example 13, the subject matter of example 11 may include that in each tier of the plurality of tiers the number of allowed suspends indicated for the tier is performed, unless the program operation is completed prior to the number of allowed suspends indicated for the tier being performed.

In example 14, the subject matter of example 13 may include that the measure of progress of the program operation is based on an amount of time elapsed since a last resumption of the program operation.

In example 15, the subject matter of example 13 may include that the measure of progress of the program operation is based on a number of program pulses the program operation has executed since a last resumption of the program operation, wherein a program pulse is an incremental threshold voltage movement of a cell to a final target voltage for the cell.

Example 16 is a non-volatile memory complex comprising an array of non-volatile memory, wherein the non-volatile memory complex is operable to: maintain a data structure for performing a program operation in a non-volatile memory of the array of non-volatile memory, wherein the program operation is allowed to be suspended to perform read operations in the non-volatile memory of the array of non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

In example 17, the subject matter of example 16 may include that in each tier of the plurality of tiers at least a predetermined amount of progress in an execution of the program operation is made before a subsequent suspend is allowed.

In example 18, the subject matter of example 16 may include that in each tier of the plurality of tiers the number of allowed suspends indicated for the tier is performed, unless the program operation is completed prior to the number of allowed suspends indicated for the tier being performed.

In example 19, the subject matter of example 18 may include that the measure of progress of the program operation is based on an amount of time elapsed since a last resumption of the program operation.

In example 20, the subject matter of example 18 may include that the measure of progress of the program operation is based on a number of program pulses the program operation has executed since a last resumption of the program operation, wherein a program pulse is an incremental threshold voltage movement of a cell to a final target voltage for the cell.

Example 21 is a system, comprising: a solid state drive (SSD) comprising a plurality of non-volatile memory; and a display communicatively coupled to the SSD to display data stored in the SSD, wherein the SSD is operable to: maintain a data structure for performing a program operation in a non-volatile memory of the plurality of non-volatile memory, wherein the program operation is allowed to be suspended to perform read operations in the non-volatile memory of the plurality of non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

In example 22, the subject matter of example 21 may include that in each tier of the plurality of tiers at least a predetermined amount of progress in an execution of the program operation is made before a subsequent suspend is allowed.

In example 23, the subject matter of example 21 may include that in each tier of the plurality of tiers the number of allowed suspends indicated for the tier is performed, unless the program operation is completed prior to the number of allowed suspends indicated for the tier being performed.

In example 24, the subject matter of example 23 may include that the measure of progress of the program operation is based on an amount of time elapsed since a last resumption of the program operation.

In example 25, the subject matter of example 23 may include that the measure of progress of the program operation is based on a number of program pulses the program operation has executed since a last resumption of the program operation, wherein a program pulse is an incremental threshold voltage movement of a cell to a final target voltage for the cell.

All optional features of any of the systems and/or apparatus described above may also be implemented with respect to the method or process described above, and specifics in the examples may be used anywhere in one or more embodiments. Additionally, all optional features of the method or process described above may also be implemented with respect to any of the system and/or apparatus described above, and specifics in the examples may be used anywhere in one or more embodiments.

What is claimed is:

1. A method, comprising:
    maintaining a data structure for performing a program operation in a NAND device, wherein the program operation is allowed to be suspended to perform read operations in the NAND device, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and
    in response to performing a resume of the program operation, after performing a read following a suspend of the program operation, determining a tier of the plurality of tiers for the program operation and performing a subsequent suspend of the program operation only after a measure of progress of the program operation has been exceeded in the determined tier.

2. The method of claim 1, wherein in each tier of the plurality of tiers at least a predetermined amount of progress in an execution of the program operation is made before a subsequent suspend is allowed.

3. The method of claim 1, wherein in each tier of the plurality of tiers the number of allowed suspends indicated for the tier is performed, unless the program operation is completed prior to the number of allowed suspends indicated for the tier being performed.

4. The method of claim 3, wherein the measure of progress of the program operation is based on an amount of time elapsed since a last resumption of the program operation.

5. The method of claim 3, wherein the measure of progress of the program operation is based on a number of program pulses the program operation has executed since a last resumption of the program operation, wherein a program pulse is an incremental threshold voltage movement of a cell to a final target voltage for the cell.

6. An apparatus, comprising:
    a non-volatile memory; and
    a controller, wherein the controller controls the non-volatile memory, and wherein the controller is operable to:
    maintain a data structure for performing a program operation in the non-volatile memory, wherein the program operation is allowed to be suspended to perform read operations in the non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and
    in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

7. The apparatus of claim 6, wherein in each tier of the plurality of tiers at least a predetermined amount of progress in an execution of the program operation is made before a subsequent suspend is allowed.

8. The apparatus of claim 6, wherein in each tier of the plurality of tiers the number of allowed suspends indicated for the tier is performed, unless the program operation is completed prior to the number of allowed suspends indicated for the tier being performed.

9. The apparatus of claim 8, wherein the measure of progress of the program operation is based on an amount of time elapsed since a last resumption of the program operation.

10. The apparatus of claim 8, wherein the measure of progress of the program operation is based on a number of program pulses the program operation has executed since a last resumption of the program operation, wherein a program pulse is an incremental threshold voltage movement of a cell to a final target voltage for the cell.

11. A controller coupled to a non-volatile memory, wherein the controller is operable to:
    maintain a data structure for performing a program operation in the non-volatile memory, wherein the program operation is allowed to be suspended to perform read operations in the non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and
    in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

12. The controller of claim 11, wherein in each tier of the plurality of tiers at least a predetermined amount of progress in an execution of the program operation is made before a subsequent suspend is allowed.

13. The controller of claim 11, wherein in each tier of the plurality of tiers the number of allowed suspends indicated for the tier is performed, unless the program operation is completed prior to the number of allowed suspends indicated for the tier being performed.

14. The controller of claim 13, wherein the measure of progress of the program operation is based on an amount of time elapsed since a last resumption of the program operation.

15. The controller of claim 13, wherein the measure of progress of the program operation is based on a number of program pulses the program operation has executed since a last resumption of the program operation, wherein a program pulse is an incremental threshold voltage movement of a cell to a final target voltage for the cell.

16. A non-volatile memory complex comprising an array of non-volatile memory, wherein the non-volatile memory complex is operable to:
    maintain a data structure for performing a program operation in a non-volatile memory of the array of non-volatile memory, wherein the program operation is allowed to be suspended to perform read operations in the non-volatile memory of the array of non-volatile memory, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and
    in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

17. The non-volatile memory complex of claim 16, wherein in each tier of the plurality of tiers at least a predetermined amount of progress in an execution of the program operation is made before a subsequent suspend is allowed.

18. The non-volatile memory complex of claim 16, wherein in each tier of the plurality of tiers the number of allowed suspends indicated for the tier is performed, unless the program operation is completed prior to the number of allowed suspends indicated for the tier being performed.

19. A system, comprising:
    a solid state drive (SSD) comprising a plurality of non-volatile memories; and
    a display communicatively coupled to the SSD to display data stored in the SSD, wherein the SSD is operable to:
    maintain a data structure for performing a program operation in a non-volatile memory of the plurality of non-volatile memories, wherein the program operation is allowed to be suspended to perform read operations in the non-volatile memory of the plurality of non-volatile memories, wherein the data structure indicates a plurality of tiers, wherein each tier of the plurality of tiers has a number of allowed suspends of the program operation while executing in the tier, and wherein a sum of the number of allowed suspends for all tiers of the plurality of tiers equals a maximum allowed number of suspends of the program operation; and
    in response to performing a resume of the program operation, after performing a read following a suspend of the program operation, determine a tier of the plurality of tiers for the program operation and perform a subsequent suspend of the program operation only after a measure of progress of the program operation has been exceeded in the determined tier.

20. The system of claim 19, wherein in each tier of the plurality of tiers at least a predetermined amount of progress in an execution of the program operation is made before a subsequent suspend is allowed.

* * * * *